US012736752B2

(12) United States Patent
Szoke

(10) Patent No.: US 12,736,752 B2
(45) Date of Patent: Sep. 15, 2026

(54) CONTRADIRECTIONAL-FILTER ARCHITECTURE HAVING LOW BACK-REFLECTION

(71) Applicant: Quintessent Inc., Goleta, CA (US)

(72) Inventor: Szilard Szoke, Los Angeles, CA (US)

(73) Assignee: QUINTESSENT INC., Goleta, CA (US)

( * ) Notice: Subject to any disclaimer, the term of this patent is extended or adjusted under 35 U.S.C. 154(b) by 340 days.

(21) Appl. No.: 18/440,149

(22) Filed: Feb. 13, 2024

(65) Prior Publication Data

US 2024/0280757 A1 Aug. 22, 2024

Related U.S. Application Data

(60) Provisional application No. 63/446,146, filed on Feb. 16, 2023.

(51) Int. Cl.
*G02B 6/293* (2006.01)

(52) U.S. Cl.
CPC ..... *G02B 6/29382* (2013.01); *G02B 6/29325* (2013.01)

(58) Field of Classification Search
CPC ........................ G02B 6/29381; G02B 6/29325
See application file for complete search history.

(56) References Cited

U.S. PATENT DOCUMENTS 4,673,270 A * 6/1987 Gordon ............. G02B 6/29383 359/900
4,737,007 A * 4/1988 Alferness ........... G02B 6/29334 385/37

(Continued)

FOREIGN PATENT DOCUMENTS

WO WO-0002078 A1 * 1/2000 ......... G02B 6/12007
WO WO-2019002763 A1 * 1/2019 ............. H01S 5/141
WO WO-2021099369 A1 * 5/2021 ................ G01J 3/28

OTHER PUBLICATIONS

Afifi et al., Contra-Directional Couplers as Pump Rejection and Recycling Filters for on-Chip Photon-Pair Sources, 2019 IEEE 16th International Conference on Group IV Photonics (GFP), Singapore, 2019, pp. 1-2. (Year: 2019).*

(Continued)

*Primary Examiner* — Peter Radkowski
(74) *Attorney, Agent, or Firm* — Kaplan Breyer Schwarz LLP

(57) ABSTRACT

The teachings of the present disclosure enable wavelength-agile WDM systems comprising wavelength drop ports based on contra-DC wavelength filters, where back-reflections at each drop port are mitigated by virtue of the system architecture. The contra-DC filters are arranged in a series along a common bus waveguide such that the operating wavelengths of the filters change in monotonic fashion through the series. As a result, back-reflections arising at each filter is suppressed by the contra-DC filter that precedes it in the series. In some embodiments, each contra-DC filter is configured such that its filter bandwidth is large enough to accommodate both its drop signal and back-reflections arising from the grating element of the preceding contra-DC filter in the series. In some embodiments, conventional back-reflection approaches are used in concert with the system-architecture approach of the present disclosure.

19 Claims, 6 Drawing Sheets

(56) References Cited

U.S. PATENT DOCUMENTS

| | | | | |
|---|---|---|---|---|
| 5,859,941 | A * | 1/1999 | Horita | G02B 6/29383 385/9 |
| 6,549,707 | B1 * | 4/2003 | Lupu | G02B 6/12007 385/37 |
| 6,611,644 | B2 * | 8/2003 | Galstian | G02B 6/02152 385/37 |
| 6,693,937 | B2 * | 2/2004 | Steffens | H01S 5/06256 372/50.1 |
| 6,801,690 | B1 * | 10/2004 | Ling | G02B 6/12007 398/87 |
| 6,876,793 | B1 * | 4/2005 | Ling | G02B 6/124 385/24 |
| 7,167,616 | B2 * | 1/2007 | Ling | G02B 6/125 385/37 |
| 7,292,752 | B2 * | 11/2007 | Faccio | G02F 1/3132 385/37 |
| 8,396,341 | B2 * | 3/2013 | Lee | G02B 6/12007 385/37 |
| 8,676,023 | B2 * | 3/2014 | Chuang | G02B 6/12007 385/144 |
| 8,995,483 | B2 * | 3/2015 | Diehl | H01S 5/0612 372/50.122 |
| 10,088,630 | B2 * | 10/2018 | Shi | G02B 6/124 |
| 10,419,123 | B2 * | 9/2019 | Menezo | H01S 5/06817 |
| 10,459,168 | B2 * | 10/2019 | Shi | G02B 6/124 |
| 10,816,726 | B1 * | 10/2020 | Peng | G02B 6/3636 |
| 10,852,472 | B1 * | 12/2020 | Ling | G02B 6/12007 |
| 11,002,980 | B1 * | 5/2021 | Ling | H04J 14/0209 |
| 11,212,005 | B1 * | 12/2021 | Jopson | H04B 10/2581 |
| 11,249,246 | B2 * | 2/2022 | Ling | G02B 6/12007 |
| 11,310,570 | B2 * | 4/2022 | Gui | H04Q 11/0005 |
| 11,467,420 | B2 * | 10/2022 | Ling | G02B 6/124 |
| 11,474,299 | B2 * | 10/2022 | Gui | G02B 6/2938 |
| 2001/0036011 | A1 * | 11/2001 | Galstian | G02B 6/02133 359/566 |
| 2003/0035455 | A1 * | 2/2003 | Steffens | H01S 5/06256 372/50.1 |
| 2003/0235368 | A1 * | 12/2003 | Kulishov | G02B 6/124 385/40 |
| 2004/0240790 | A1 * | 12/2004 | Gopinath | G02F 1/3132 385/39 |
| 2005/0259923 | A1 * | 11/2005 | Sriram | G02F 1/3132 385/50 |
| 2006/0039647 | A1 * | 2/2006 | Ling | G02B 6/12007 385/24 |
| 2007/0058900 | A1 * | 3/2007 | Faccio | G02F 1/3132 385/37 |
| 2007/0211984 | A1 * | 9/2007 | Gopinath | G02F 1/3132 385/39 |
| 2011/0103762 | A1 * | 5/2011 | Lee | G02B 6/124 385/124 |
| 2013/0129934 | A1 * | 5/2013 | Chuang | G02B 6/13 427/510 |
| 2013/0156052 | A1 * | 6/2013 | Diehl | H01S 5/0612 372/20 |
| 2017/0138789 | A1 * | 5/2017 | Ivanov | G02B 6/305 |
| 2018/0059328 | A1 * | 3/2018 | Shi | G02B 6/124 |
| 2019/0079246 | A1 * | 3/2019 | Shi | G02B 6/124 |
| 2019/0181955 | A1 * | 6/2019 | Menezo | H04B 10/675 |
| 2019/0317282 | A1 * | 10/2019 | Cho | G02B 6/131 |
| 2020/0400878 | A1 * | 12/2020 | Ling | G02B 6/02076 |
| 2021/0037298 | A1 * | 2/2021 | Gui | H04J 14/02 |
| 2021/0109281 | A1 * | 4/2021 | Ling | G02B 6/4215 |
| 2021/0149117 | A1 * | 5/2021 | Gui | G02B 6/29367 |
| 2021/0286190 | A1 * | 9/2021 | Ling | G02B 5/1861 |

OTHER PUBLICATIONS

Afifi et al., Integrated Contra-directional Pump-reject Filters for Photon-pair Sources in Silicon, 2021 Conference on Lasers and Electro-Optics (CLEO), San Jose, CA, USA, 2021, pp. 1-2. (Year: 2021).*

Afifi et al., Contra-directional pump reject filters integrated with a micro-ring resonator photon-pair source in silicon, Opt. Express 29, 25173-25188 (2021) (Year: 2021).*

Boroojerdi et al., Two-period contra-directional grating assisted coupler, Opt. Express 24, 22865-22874 (2016) (Year: 2016).*

Cauchon et al., Thermally chirped contra-directional couplers for residueless, bandwidth-tunable Bragg filters with fabrication error compensation, Opt. Lett. 46, 532-535 (2021) (Year: 2021).*

Chen et al., Subwavelength Grating Waveguide Devices for Telecommunications Applications, in IEEE Journal of Selected Topics in Quantum Electronics, vol. 25, No. 3, pp. 1-11, May-Jun. 2019, Art No. 8200111, doi: 10.1109/JSTQE.2018.2879015. (Year: 2019).*

Hammood et al., Compact Contra-Directional-Coupler-Based Filters for CWDM Applications, 2018 IEEE 15th International Conference on Group IV Photonics (GFP), pp. 1-2, 2018. (Year: 2018).*

Hammood et al., Broadband, silicon photonic, optical add-drop filters with 3dB bandwidths up to 11THz, Opt. Lett. 46, 2738-2741 (2021) (Year: 2021).*

Hammood et al., Compact Contra-Directional-Coupler-Based Filters for CWDM Applications, 2018 IEEE 15th International Conference on Group IV Photonics (GFP), Cancun, Mexico, 2018, pp. 1-2, doi: 10.1109/GROUP4.2018.8478753 (Year: 2018).*

Hammood et al., (2019). Compact, silicon-on-insulator, series-cascaded, contradirectional-coupling-based filters with >50 dB adjacent channel isolation. Optics Letters. 44. 439-442. 10.1364/OL.44.000439. (Year: 2019).*

He et al., On-chip silicon mode blocking filter employing subwavelength-grating based contra-directional coupler. Opt Express. Dec. 10, 2018;26(25):33005-33012. doi: 10.1364/OE.26.033005. PMID: 30645458 (Year: 2018).*

Liao et al., Broadband tunable filter based on the cascaded contra-directional couplers, in 26th Optoelectronics and Communications Conference, P. Alexander Wai, H. Tam, and C. Yu, eds., OSA Technical Digest (Optica Publishing Group, 2021), paper T1E.4. (Year: 2021).*

Nie et al., Grating assisted contra-directional filters with high rejection ratio in silicon nitride rib waveguides, European conference on Integrated Optics (ECIO), 2019 (Year: 2019).*

Nie et al., High extinction ratio on-chip pump-rejection filter based on cascaded grating-assisted contra-directional couplers in silicon nitride rib waveguides, Opt. Lett. 44, 2310-2313 (2019) (Year: 2019).*

Shi et al., Silicon photonics for high-capacity data communications, Photon. Res. 10, A106-A134 (2022) (Year: 2022).*

Shi et al., Silicon photonic grating-assisted, contra-directional couplers. Opt Express. Feb. 11, 2013;21(3):3633-50. doi: 10.1364/OE.21.003633. PMID: 23481820. (Year: 2013).*

Shi et al., Ultra-compact, flat-top demultiplexer using anti-reflection contra-directional couplers for CWDM networks on silicon, Opt. Express, vol. 21, No. 6, pp. 6733-6738, Mar. 2013. (Year: 2013).*

Shi et al., Design and characterization of microring reflectors with a waveguide crossing, Opt. Lett., vol. 35, No. 17, pp. 2901-2903, Sep. 2010. (Year: 2010).*

Shi et al., Silicon CWDM demultiplexers using contra-directional couplers, in CLEO: 2013, Jun. 2013, pp. 1-2. (Year: 2013).*

Shu et al., (2019). A Design Guideline for Mode (DE) Multiplexer Based on Integrated Tapered Asymmetric Directional Coupler. IEEE Photonics Journal. pp. 1-1. 10.1109/JPHOT.2019.2941742. (Year: 2019).*

Jonathan St-Yves, Contra-directional couplers as optical filters on the silicon on insulator platform, Dissertation, Québec, Canada, 2017 (Year: 2017).*

Tunesi et al., Thermal Control Scheme in Contra-Directional Couplers for Centered Tunable Bandwidths, 2023 International Conference on Numerical Simulation of Optoelectronic Devices (NUSOD), Turin, Italy, 2023, pp. 115-116. (Year: 2023).*

Wang et al., (2021). Ultracompact bandwidth-tunable filter based on subwavelength grating-assisted contra-directional couplers. Frontiers of optoelectronics, 14(3), 374-380. https://doi.org/10.1007/s12200-020-1056-5 (Year: 2021).*

(56) References Cited

OTHER PUBLICATIONS

Yun et al., (2019). Optical Add-drop Filters using Cladding-modulated Sub-wavelength Grating Contra-directional Couplers for Silicon-on-Insulator Platforms. 0926-0931. 10.1109/IEMCON.2019.8936256. (Year: 2019).*

Zhang et al., On-chip optical mode exchange using tapered directional coupler. Sci Rep 5, 16072 (2015). https://doi.org/10.1038/srep16072 (Year: 2015).*

Jiang et al., Broadband tunable filter based on the loop of multimode Bragg grating, Opt. Express 26, 559-566 (2018) (Year: 2018).*

Zubkova et al., Optimization of contra-directional coupler based on silicon nitride Bragg rib waveguide, Journal of Physics: Conference Series, vol. 1124, Issue 5, 2018 (Year: 2018).*

Boyu Liu, et al., "Silicon photonic bandpass filter based on apodized subwavelength grating with high suppression ratio and short coupling length", Optics Express, May 15, 2017, pp. 11359-11364, vol. 25, No. 10, https://doi.org/10.1364/OE.25.011359.

Dominique Charron, et al., "Subwavelength-grating contradirectional couplers for large stopband filters", Optics Letters, Feb. 15, 2018, Optical Society of America, pp. 895-898, vol. 43, No. 4, https://doi.org/10.1364/OL.43.000895.

Han Yun, et al., "Broadband flat-top SOI add-drop filters using apodized sub-wavelength grating contradirectional couplers," Optics Letters, Oct. 15, 2019, Optical Society of America, pp. 4929-4932, vol. 44, No. 20, https://doi.org/10.1364/OL.44.004929.

Szilard Szoke, Unpublished Related U.S. Appl. No. 18/414,727, entitled Sin-Based Contra-Directional Filter for WDM Systems, Jan. 17, 2024, 29 pp.

Wei Shi, et al., "Ultra-compact, flat-top demultiplexer using anti-reflection contra-directional couplers for CWDM networks on silicon," Optics Express, Mar. 25, 2013, Optical Society of America, pp. 6733-6738, vol. 21, No. 6.

* cited by examiner

System 200
210
212
122-N
214
110-N
202-N
LN
120-4
BWP-N
102
122-3
214
BWP-3
120-4
202-3
110-3
L3
120-3
122-2
214
110-2
BWP-2
202-2
L2
120-2
120-3
110-1
122-1
214
202-1
120-2
L1
120-1
Bus Waveguide Portion BWP-1
204
120-1
206
208

Spectrum 300
$\lambda_{BrWg} < \lambda_{drop} \ll \lambda_{BrGr}$
Signal Spectrum
L1
L2
L3
L4
λ
Filter Spectrum
FBW1
FBW2
FBW3
FBW4
120-1
110-1
120-2
110-2
122-1
122-2
λ
$\lambda_{BrWg1}$
$\lambda_{drop1}$
$\lambda_{BrWg2}$
$\lambda_{drop2}$
$\lambda_{BrGr1}$
$\lambda_{BrGr2}$
Composite Bandwidth CBW Spectrum 400
$\lambda_{BrWg} < \lambda_{drop} < \lambda_{BrGr}$
Signal Spectrum
L1
L2
L3
L4
λ
Filter Spectrum
FBW1
120-2
FBW2
FBW3
FBW4
120-1
110-1
122-1
110-2
122-2
λ
$\lambda_{drop1}$
$\lambda_{BrGr1}$
$\lambda_{BrWg1}$
$\lambda_{drop2}$
$\lambda_{BrGr2}$
$\lambda_{BrWg2}$
Composite Bandwidth CBW Spectrum 500
$\lambda_{BrWg} < \lambda_{drop} < \lambda_{BrGr}$
Signal Spectrum
Filter Spectrum
λ
λ
L1
L2
L3
L4
FBW1
FBW2
FBW3
FBW4
502-1
502-2
502-3
502-4
$\lambda_{BrWg1}$
$\lambda_{drop1}$
$\lambda_{BrWg2}$
$\lambda_{BrGr1}$
$\lambda_{drop2}$
$\lambda_{BrGr2}$
120-1
110-1
120-2
122-1
110-2
122-2
Composite Bandwidth CBW

FIG. 6

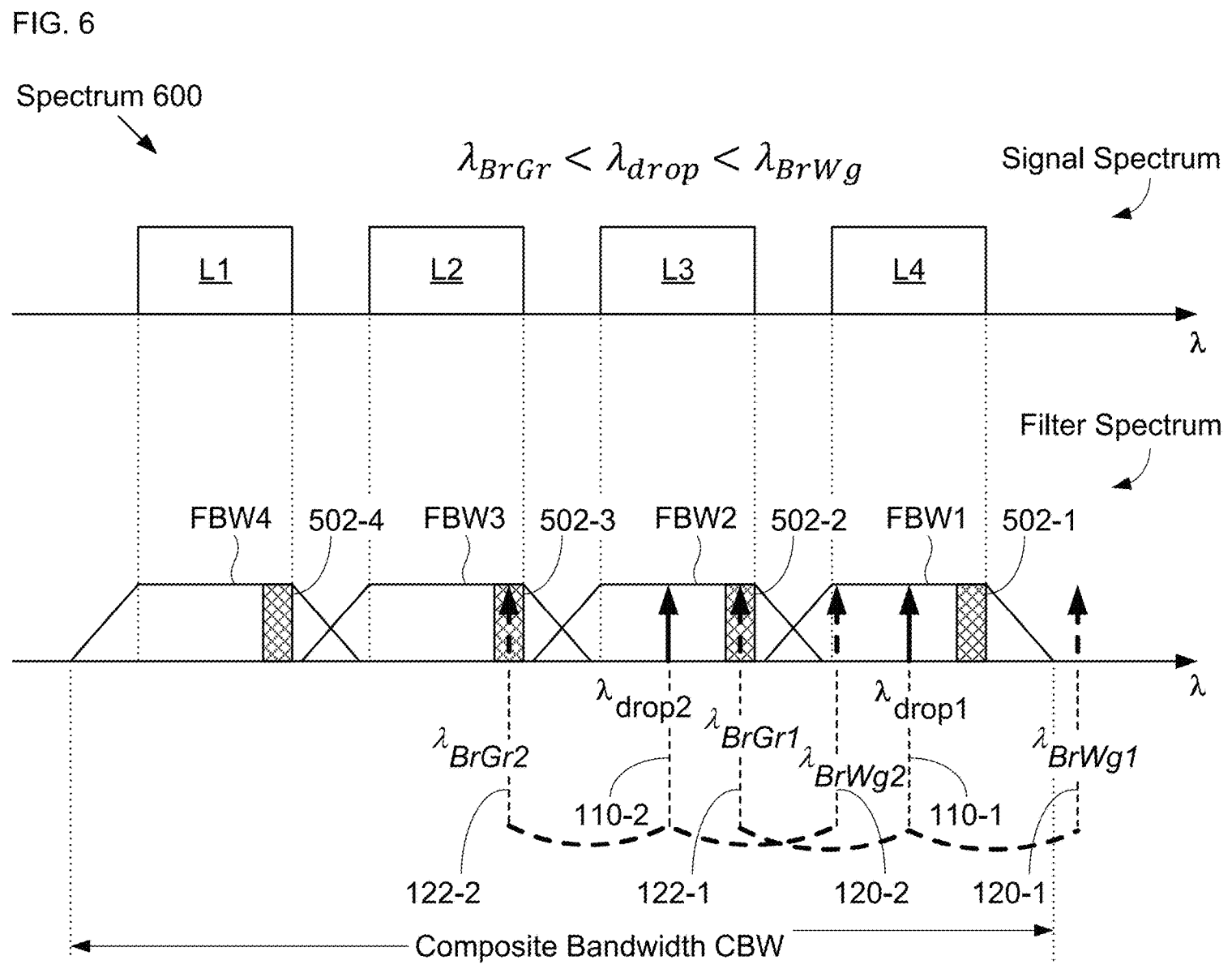

Spectrum 600

$\lambda_{BrGr} < \lambda_{drop} < \lambda_{BrWg}$

Signal Spectrum

Filter Spectrum

λ

L1

L2

L3

L4

FBW1

FBW2

FBW3

FBW4

502-1

502-2

502-3

502-4

$\lambda_{drop1}$ $\lambda_{drop2}$ $\lambda_{BrWg1}$ $\lambda_{BrWg2}$ $\lambda_{BrGr1}$ $\lambda_{BrGr2}$ 110-1

110-2

120-1

120-2

122-1

122-2

Composite Bandwidth CBW

CONTRADIRECTIONAL-FILTER ARCHITECTURE HAVING LOW BACK-REFLECTION

CROSS REFERENCE TO RELATED APPLICATIONS

This case claims priority of U.S. Provisional Patent Application Ser. No. 63/446,146, filed Feb. 16, 2023, which is incorporated herein by reference. If there are any contradictions or inconsistencies in language between this application and one or more of the cases that have been incorporated by reference that might affect the interpretation of the claims in this case, the claims in this case should be interpreted to be consistent with the language in this case.

TECHNICAL FIELD

The present disclosure relates to photonic elements in general, and, more particularly, to integrated-photonics-based wavelength filters for wavelength-division-multiplexed systems.

BACKGROUND

Wavelength Division Multiplexed (WDM) systems can carry tremendous amounts of information and have found widespread use in many applications, such as optical communications systems and sub-systems, WDM-based networking, optical input/output for high-performance integrated circuits, LiDAR, sensing, and the like.

In a typical WDM system, many individual wavelength signals are combined ("multiplexed") to form a broadband signal that can be transmitted through at least a portion of the system. At different points in the WDM system, one or more of the wavelength signals might be split out of a broadband signal ("demultiplexed") so that it can be operated on individually and/or transmitted to a different destination than other wavelength signals in the broadband signal.

Each wavelength signal of a broadband signal has a different center wavelength and a wavelength spacing that surrounds it, which collectively determine the total spectral range (i.e., spectral window of operation) of the WDM system. The aggregate information-carrying capacity is determined by the data rate of the wavelength signals and their total number. Over the years, the number of wavelength signals has increased such that modern WDM systems require a very wide spectral range of operation.

More recently, photonic integrated circuits (PICs) comprising complete WDM systems and/or WDM sub-systems disposed on a single substrate have been developed, in part, to reduce the cost/complexity of such systems by eliminating packaging requirements, alignment issues during assembly and use, reduce overall system size, etc.

In theory, PICs based on single-mode waveguide designs possess a spectral window of operation (i.e., spectral bandwidth) suitable for use in modern WDM systems. In practice, however, the window of operation of a PIC is primarily limited by the material properties of the waveguide materials used, system architecture, the functional bandwidth of passive photonic circuit elements, and the ultimate performance of detectors required to measure any signals upon which it operates.

As a result, it is sometimes necessary to use "coarse WDM" techniques to demultiplex a broadband signal by splitting it into multiple narrower-spectrum signals (referred to as "wide-bandwidth channels"), each containing multiple wavelength signals. "Dense WDM" techniques are then subsequently used to separate these wide-bandwidth channels into their constituent narrow-bandwidth wavelength signals. The finer and more compact this fragmentation can be performed, the more utilizable wavelengths can be incorporated into a PIC, thus increasing its aggregate information-carrying capacity.

Wavelength multiplexing and demultiplexing is often performed using an add-drop filter, where such filters can be based on any of a variety of photonic devices, such as Bragg gratings, microring resonators, and arrayed waveguide gratings (AWG), among others. The choice of filter device is largely limited by considerations such as filtering performance (e.g., channel crosstalk, insertion loss, spectral bandwidth, etc.), footprint, and scalability.

More recently, the contra-directional coupler (contra-DC) filter has begun to garner more interest for use in PIC filter elements. Prior-art examples of bandpass filters based on contra-DC filters are discussed by Liu, et al., in "Silicon photonic bandpass filter based on apodized subwavelength grating with high suppression ratio and short coupling length," *Optics Express*, Vol. 25, pp. 11359-11364 (2017), by Charron, et al., "Subwavelength-grating contradirectional couplers for large stopband filters," *Opt. Lett.*, Vol. 43, pp. 895-898 (2018), and by Yun, et al., "Broadband flat-top SOI add-drop filters using apodized sub-wavelength grating contradirectional couplers," *Opt. Lett.*, Vol. 44, pp. 4929-4932 (2019).

A contra-DC filter includes a grating element that is optically coupled to a bus waveguide so as to form a particular region of the device which acts as a reflective spectral filter. The grating element includes a drop port, while the bus waveguide includes an input port and a through port located on either side of the mirror region. In operation, as a multiwavelength signal propagates through the bus waveguide, the contra-DC filter selectively reflects one wide-bandwidth channel of the broadband signal to the drop port, thereby removing it from the broadband signal.

Contra-DC filters are attractive in many applications due to their potential for broad spectral operation and sharp roll-off behavior. Unfortunately, a contra-DC filter inherently generates back-reflections in the bus waveguide. While these can be suppressed in magnitude by various design improvements, it is difficult, if not impossible, to completely eliminate them. This poses particular problems in photonic integrated circuits where sensitive active elements (e.g. lasers, optical amplifiers, etc.) are often found upstream of the filtering element—particularly when there is low optical loss between the contra-DC filter and the sensitive device. These back-reflections can cause these active elements to de-stabilize and adversely affect their performance. Although it has been shown that the strength of individual back-reflections can be reduced to potentially enable systems where their deleterious effects are mitigated, it is possible for back-reflections from multiple sources in a PIC to coherently add up to levels that exceed what is acceptable.

Perhaps the most common approach to mitigating back-reflections in prior-art systems is to use optical isolators where necessary. Unfortunately, optical isolators can be prohibitively expensive and/or challenging to include in many systems. They can also give rise to undesirable excess loss and require considerable additional fabrication effort, while also taking up valuable space in a PIC.

Another common approach for mitigating back-reflections associated with contra-DC filters is based on making the effective index contrast between the bus waveguide and the grating element sufficiently large, so as to tune the secondary resonances away from the wavelength range of interest. In principle, this can work well; however, it requires careful design of each device and can be unachievable given the limitations associated with developing a manufacturable geometry. In addition, in a multi-channel coarse-WDM (CWDM) architecture, it can be exceedingly difficult to design each of the filtering elements uniquely such that all the relevant spectral components are positioned correctly. This is further hindered by the aforementioned constraints to the possible physical geometry (i.e. minimum feature size), making a multi-channel design potentially impossible. These issues are further compounded depending on the refractive index of the host material used for the photonic integrated circuit, with low-refractive-index materials making it more challenging to attain the range of required index contrasts with physically realizable feature sizes.

Perhaps the most viable prior-art approach for mitigating back-reflections from a contra-DC filter is the implementation of an out-of-phase grating on the bus waveguide, as described by Shi, et al., in "Ultra-compact, flat-top demultiplexer using anti-reflection contra-DC couplers for CWDM networks on silicon," *Optics Express* 21, 6733-6738 (2013). The grating functions as an anti-reflection grating that is designed to facilitate destructive interference between the backwards propagating modes of the filter. However, the inclusion of such gratings still requires the precise fabrication of two side-by-side gratings that must be aligned with extremely high accuracy, wherein any misalignment significantly impacts the reflection suppression. The requirement for the bus-waveguide to be a grating-type structure as well, further complicates the design of the filters.

A practical approach for mitigating back-reflections from contra-DC filters in a photonic integrated circuit remains, as yet, unrealized in the prior art.

SUMMARY

The present disclosure is directed toward mitigating back-reflection issues in WDM system architectures that employ contra-DC filters. Embodiments in accordance with the present disclosure are particularly well suited for use in applications such as WDM optical communications systems, LIDAR, sensing, and the like.

An advance over the prior art is realized by configuring a WDM system having a bus waveguide that is operatively coupled with a series of drop ports, where each drop port comprises a contra-DC filter for dropping a different wavelength signal or bandwidth channel of a WDM signal propagating in the bus waveguide. The series of contra-DC filters is arranged such that their operating wavelengths change in monotonic fashion and so back-reflections arising at each filter is suppressed by the contra-DC filter that precedes it in the series.

An illustrative embodiment in accordance with the present disclosure is a CWDM system that includes a bus waveguide coupled with a series of N drop elements, each of which includes a contra-DC filter and a drop port. Each contra-DC filter is configured to direct a drop signal to its respective drop port, where each drop signal includes a different CWDM wavelength band. The series of drop elements is arranged such that each drop element in the series is configured to suppress back-reflections that originate at the next drop element in the series. The system also includes an additional spectral filter that precedes the first drop element in the series, where the spectral filter is configured to suppress back-reflections originating at the first drop element.

In some embodiments, the system is a dense-WDM (DWDM) system and each drop filter is configured to drop a wavelength signal that includes a different wavelength signal of a DWDM signal propagating through the system.

In some embodiments, the filter bandwidth of each contra-DC filter is large enough to accommodate both its drop signal and back-reflections arising from the grating element of the preceding contra-DC filter in the series of drop elements.

In some embodiments, a system architecture in accordance with the present disclosure is coupled with one or more back-reflection-suppression approaches known in the prior art.

An embodiment in accordance with the present disclosure is a wavelength division multiplexed (WDM) system comprising: a bus waveguide for receiving a WDM signal that includes a plurality of wavelength signals; and a plurality of contra-directional coupler (contra-DC) filters, each including a grating element that is optically coupled with the bus waveguide, wherein each contra-DC filter of the plurality thereof is characterized by a different filter bandwidth and different drop signal that includes a drop wavelength, and wherein the plurality of contra-DC filters is arranged in a series along the bus waveguide such that the plurality of filter bandwidths are non-overlapping and the plurality of drop wavelengths changes monotonically along the series; wherein each contra-DC filter includes a grating element that is optically coupled with the bus waveguide, the grating element comprising a periodic arrangement of teeth and a grating waveguide that extends through the entire length of the grating element, the grating waveguide including a drop port.

Another embodiment in accordance with the present disclosure is a method for dropping at least one wavelength signal from a wavelength divisional multiplexed (WDM) signal that includes a first plurality of wavelength signals, the method comprising: providing the WDM signal on a bus waveguide that is operatively coupled with a plurality of contra-directional coupler (contra-DC) filters, each including a different bus-waveguide portion of a common bus waveguide, wherein each contra-DC filter of the plurality thereof is characterized by a different filter bandwidth and different drop signal that includes a drop wavelength, and wherein the plurality of contra-DC filters is arranged in a series along the bus waveguide such that the plurality of filter bandwidths are non-overlapping and the plurality of drop wavelengths changes monotonically along the series; dropping a first drop signal to a first drop port of a first contra-DC filter of the plurality thereof; and dropping a second drop signal at a second drop port of a second contra-DC filter of the plurality thereof.

BRIEF DESCRIPTION OF THE DRAWINGS

FIG. 6 depicts the spectral response of an exemplary approach for addressing backward propagating modes in the grating elements of a system architecture comprising contra-DC filters arranged in a "longest-wavelength to shortest-wavelength" order in accordance with the present disclosure.

DETAILED DESCRIPTION

Figures 1A, 1B:
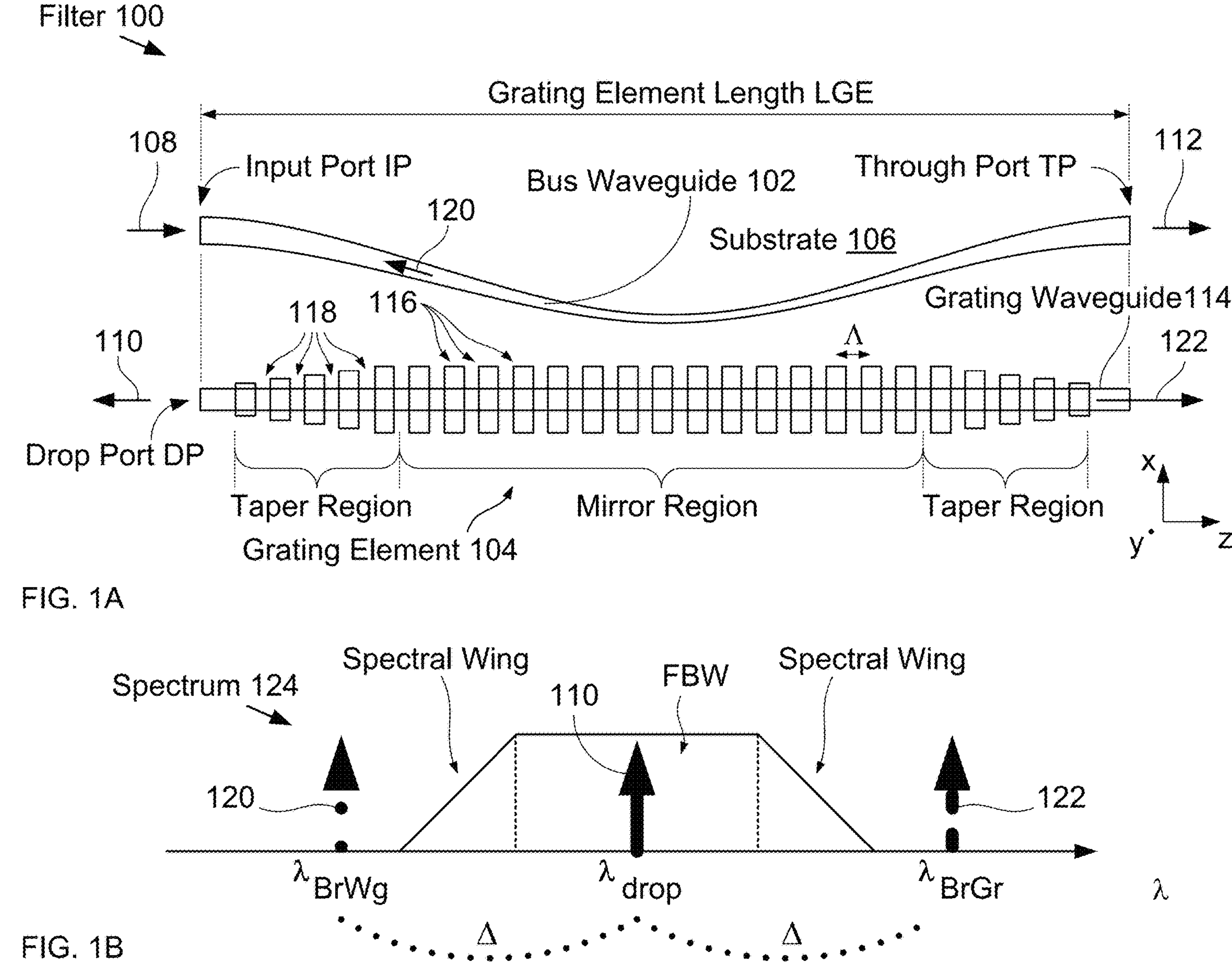
FIG. 1A depicts an operational schematic drawing of a contra-DC filter in accordance with the present disclosure.
FIG. 1B depicts an exemplary spectral response of a contra-DC filter in accordance with the present disclosure.

Basic Operation of a Contra-DC Filter in Accordance With the Present Disclosure FIG. 1A depicts an operational schematic drawing of a contra-DC filter in accordance with the present disclosure. Filter 100 includes bus waveguide 102, grating element 104, input port IP, through port TP, and drop port DP.

Bus waveguide 102 and grating element 104 are integrated-optics waveguide-based elements arranged on a suitable substrate 106 to define a central mirror region located between symmetric taper regions. In the depicted example, substrate 106 is a conventional silicon-on-insulator wafer; however, any substrate suitable for planar processing can be used without departing from the scope of the present disclosure.

Bus waveguide 102 includes input port IP and through port TP. In the depicted example, bus waveguide 102 comprises a waveguide core that is made of silicon nitride and has a shape and interaction geometry that are configured to provide good filtering response for the coupled waveguide-grating system. Given the generally good confinement of the fundamental mode of a light signal in a single-mode optimized geometry, the width of the bus waveguide is modified along the z-axis such that the optical mode of a light signal propagating through the bus waveguide is less confined in the mirror region.

It is an aspect of the present disclosure that the core of bus waveguide 102 is tapered such that it enables an adiabatic transformation of the optical mode of a light signal propagating through the filter from input port IP, to its state in the mirror region, to though port TP and drop port DP. As will be apparent to one skilled in the art, an adiabatic transition is one that occurs without significant optical loss, as well as to realize equal suppression of sidelobes on both sides of the filter band and mitigation of scattering losses. Furthermore, equal suppression of sidelobes and, as a result, a more symmetric filter spectrum, is achieved by maintaining phase-matching at the desired drop wavelength throughout the entire length of the device. For embodiments in accordance with the present disclosure, to maintain phase-matching, the propagation constants of the supermodes are adjusted as the device transitions between the weakly coupled and strongly coupled regions via implemented S-bends (or other transition shape chosen to facilitate an adiabatic transition) as well as the tapering of the core of the bus waveguide.

It should be noted that, typically, the functional form of the tapering of the width of bus waveguide 102 is highly important so as to facilitate this adiabatic transformation of the optical mode through the filter, as well as to maintain phase-matching between the bus waveguide and grating modes throughout the taper. Examples of suitable bus waveguide tapers are provided in U.S. patent application Ser. No. 18/414,727, filed Jan. 17, 2024, which is incorporated herein by reference.

Grating element 104 includes grating waveguide 114 and a periodic arrangement of teeth 116 that are optically coupled with the grating waveguide. In the depicted example, grating waveguide 114 is a single-mode silicon nitride waveguide that runs through the entire length, LGE, of grating element 104 and includes drop port DP. Teeth 116 are also regions of silicon nitride that project outward from the grating waveguide along the x-direction. Typically, the amount any specific tooth extends outward from the grating waveguide (i.e., its tooth length) is dependent upon the specific location of that tooth within the grating structure, as discussed in U.S. patent application Ser. No. 18/414,727. In the depicted example, teeth 116 have uniform width (i.e., dimension along the longitudinal axis of grating element 104—the z-axis, as shown in FIG. 1) and are separated from one another by uniform gaps 118 such that grating element 104 has a uniform grating period, A; however, in some embodiments, at least one of teeth 116 and gaps 118 have non-uniform width.

It should be noted that, although the depicted example employs silicon nitride waveguides, the teachings of the present disclosure are applicable to waveguides of any suitable material (e.g., silicon, silicon oxide, germanium, lithium niobate, compound semiconductors, etc.).

The silicon nitride elements of filter 100 are encased in cladding material. In the depicted example, the cladding material is silicon dioxide; however, any suitable cladding material can be used without departing from the scope of the present disclosure.

In operation, filter 100 receives light signal 108 as a multiwavelength signal at input port IP of bus waveguide 102, redirects those wavelength components of light signal 108 within its filter bandwidth to drop port DP as drop signal 110, and provides the remaining wavelength components of light signal 108 to through port TP as through signal 112.

As will be apparent to one skilled in the art, a contra-DC filter is normally configured such that the bus waveguide and grating element are characterized by three distinct Bragg conditions. A "primary" condition associated with the coupled system and two "secondary" conditions associated with the individual elements (bus waveguide and grating separately), which can be expressed as:

$$\lambda_{drop} = \Lambda(n_{wg} + n_{gr}) \text{ (primary)}$$

$$\lambda_{BrWg} = 2n_{wg}\Lambda \text{ (secondary)}$$

$$\lambda_{BrGr} = 2n_{gr}\Lambda \text{ (secondary)}$$

The primary reflection is taken to be the one which is utilized for the filter bandwidth of the contra-DC filter, which determines the drop wavelengths, $\lambda_{drop}$, included in drop signal 110. As is common with contra-DC filters, the filter bandwidth can be relatively large (>10 nm), provided satisfactory design.

The two secondary reflections are a byproduct of the grating element diffracting the forward propagating mode in the bus waveguide into reflection signals 120 and 122, where the reflected spectrum of reflection signal 120 manifests as a backward propagating mode, $\vec{E}_{\lambda_{BrWg}}$, in bus waveguide 102 and the reflected spectrum of reflection signal 122 manifests as a backward propagating mode, $\vec{E}_{\lambda_{BrGr}}$ in grating waveguide 114.

In highly integrated photonic circuits, backward propagating mode, $\vec{E}_{\lambda_{BrWg}}$, is of primary concern, since it propagates backward along the main optical path that potentially contains active elements. While the backward propagating mode in the grating element at $\vec{E}_{\lambda_{BrGr}}$, is similarly undesirable, it is more easily mitigated than $\vec{E}_{\lambda_{BrWg}}$ in the main circuit path.

FIG. 1B depicts an exemplary spectral response of a contra-DC filter in accordance with the present disclosure. Spectrum 124 shows the filter bandwidth, FBW, of filter 100 and its respective drop signal 110 at drop wavelength, $\lambda_{drop}$, as well as reflection signals 120 and 122 (at $\lambda_{BrWg}$, and $\lambda_{BrGr}$, respectively), which are spectrally located on either side of drop signal 110.

For the purposes of this Specification, including the appended claims, "filter bandwidth," is defined as the spectral band within which the drop signal of a filter is at most 1 dB below the nominal, peak signal strength.

It should be noted that the spectral response of each drop filter includes a central filter bandwidth (as defined above), as well as "spectral wings" on either side of the filter bandwidth. Typically, it is desirable that these spectral wings are extremely narrow (i.e., the spectral response of the filter has a "sharp roll off") such that they do not substantially contribute to the operational behavior of the filter. Furthermore, spectrally narrow spectral wings enable denser packing of the filter bandwidths of a plurality of drop filters.

The de-tuning, Δ, between $\lambda_{drop}$ and $\lambda_{BrWg}$ (and simultaneously $\lambda_{BrGr}$) can be adjusted through the appropriate design of the device geometry. In practice, positioning $\lambda_{BrWg}$ on the blue side (i.e., the shorter-wavelength side) of $\lambda_{drop}$ and $\lambda_{BrGr}$ on the red side (i.e., the longer-wavelength side) of $\lambda_{drop}$ is a more straight-forward approach; however, these spectral positions can be reversed without departing from the scope of the present disclosure.

Figure 2:
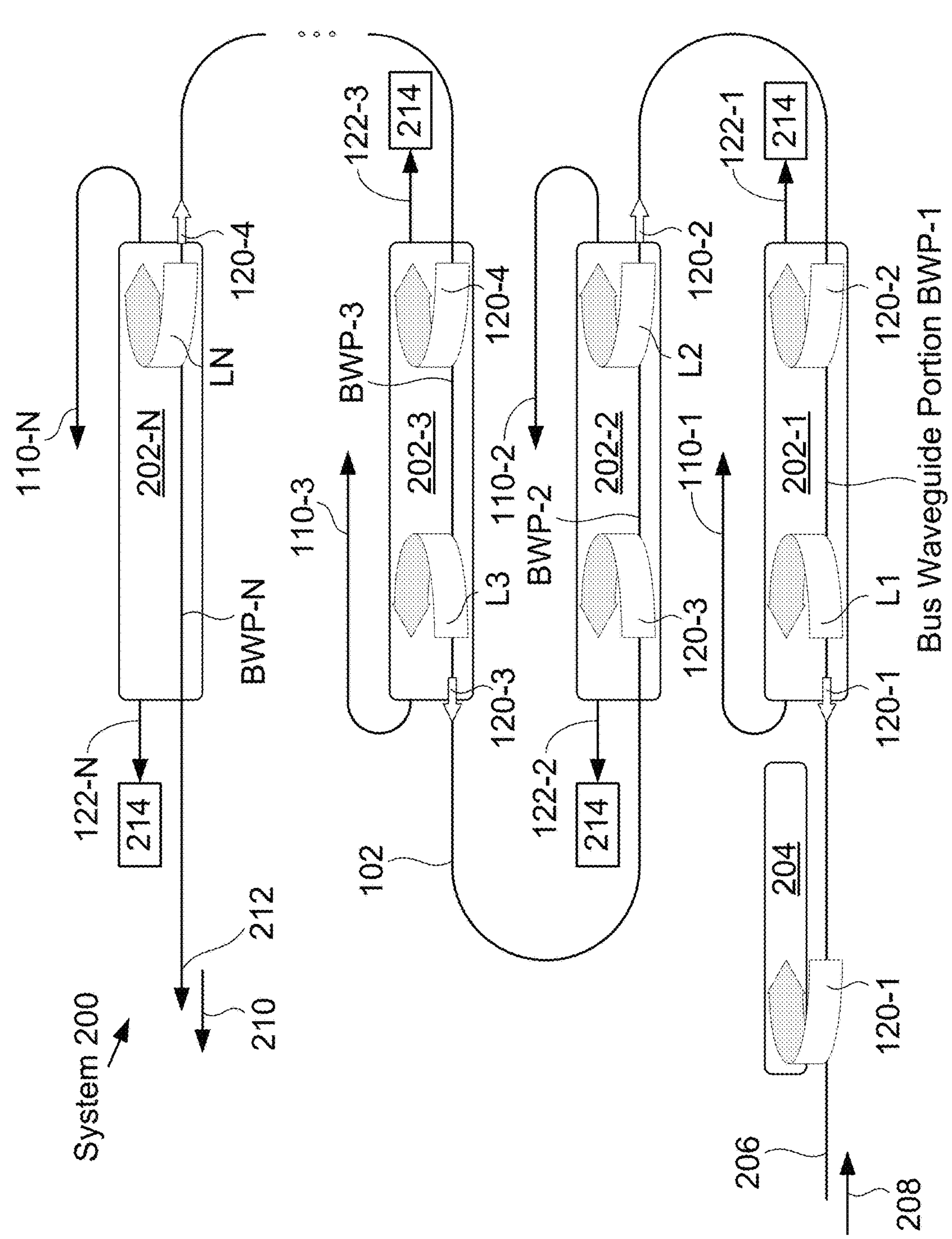
FIG. 2 depicts a schematic drawing of an illustrative embodiment of a WDM architecture in accordance with the present disclosure.

FIG. 2 depicts a schematic drawing of an illustrative embodiment of a WDM architecture in accordance with the present disclosure. System 200 includes filters 202-1 through 202-N and filter 204.

Each of filters 202-1 through 202-N (referred to, collectively, as filters 202) is analogous to filter 100 described above and are configured such their filter bandwidths are non-overlapping (although there can be some overlap of the spectral wings of adjacent filters). Filters 202 are arranged in series along common bus waveguide 102 such that each filter 202-*i* includes a grating element 104-*i* that is optically coupled with a different bus-waveguide portion BWP-i of the bus waveguide. Bus waveguide 102 receives input signal 208 at system input port 206, passes it through filters 202, and provides output signal 210 at output port 212. As will be apparent to one skilled in the art, the spectrum of output signal 210 is characterized by "notches" due to the drop signals that manifest at each of filters 202. In the depicted example, each of filters 202 also includes an optional conventional beam dump 214 for removing unwanted light from its grating waveguide.

Input signal 208 is a conventional WDM signal that includes a plurality of wavelength channels. In the depicted example, input signal 208 is a standard CWDM signal containing N CWDM channels, L1 through LN, where each CWDM channel includes a plurality of DWDM channels. In some embodiments, however, input signal 208 is other than a standard CWDM signal and N can be any practical number. In some embodiments, each CWDM channel is an information-carrying channel that includes a plurality of wavelength signals. In some embodiments, the CWDM channels are spaced apart by 20 nm (in accordance with the ITU-T G.649.2 standard); however, other CWDM channel spacings that are commensurate with a set of desired contra-DC filters bandwidths can be used without departing from the scope of the present disclosure.

Furthermore, in some embodiments, the wavelength signals included in at least one CWDM channel are DWDM signals in accordance with the ITU-T G.649.1 standard; however, other sets of wavelength signals can be used one or more of the CWDM channels without departing from the scope of the present disclosure.

Filters 202 are arranged along the bus waveguide such that their drop wavelengths ($\lambda_{drop1}$ through $\lambda_{dropN}$) are in a "shortest-wavelength to longest-wavelength" order. In other words, the center wavelengths of the filter bandwidths increase monotonically through the series of filters such that filters 202-1 through 202-N are configured to drop wavelength channels L1 through LN, respectively, where $\lambda_{L1}<\lambda_{L2}< \ldots <\lambda_{LN-1}<\lambda_{LN}$. In some embodiments, filters 202 are arranged in a "longest-wavelength to shortest-wavelength" order.

By virtue of this ordered arrangement, at each of filters 202, the reflected signal 120 containing the backward propagating mode, $\vec{E}_{\lambda_{BrWg}}$, it produces is within the filter bandwidth FBW of its respective preceding filter in the series. As a result, the filter bandwidth of each filter functions as a "stop band" that suppresses the backward propagating mode caused by the next filter in the series. For example, the backward propagating mode, $\vec{E}_{\lambda_{BrWg}}$, of reflection signal 120-2, which is launched into bus waveguide 102 by filter 202-2, is within the stop band of filter 202-1, the backward propagating mode, $\vec{E}_{\lambda_{BrWg}}$, of reflection signal 120-3, which is launched into bus waveguide 102 by filter 202-3, is within the stop band of filter 202-2, and so on.

Since the first contra-DC filter in the series, filter 202-1, has no preceding contra-DC filter, system 200 includes additional optional filter 204, which is configured to suppress the backward propagating mode, $\vec{E}_{\lambda_{BrWg}}$, launched into bus waveguide by filter 202-1. It should be noted that filter 204 can be any suitable filter having the appropriate stop band.

An inherent benefit of the architecture of system 200 is that reflections in the circuit at $\lambda_{BrWg}$ for each filter in the series are strongly inhibited/eliminated, owing to the lack of optical power present at that wavelength. This is due to the fact that an arbitrary filter 202-*i*, where i=1 through N, in the series filters out most of the light at the wavelengths around $\lambda_{BrWg}$ associated with filter 202-(*i*+1). As will be apparent to one skilled in the art, after reading this specification, for systems having filters arranged in a "longest-wavelength to shortest-wavelength" order, filter 202-*i* in the series filters out most of the light at the wavelengths around $\lambda_{BrWg}$ associated with filter 202-(*i*−1).

As a result, not only does an arrangement of filters in accordance with the present disclosure ensure that no backwards propagating modes travel upstream (or downstream, in some embodiments) in the PIC, it also greatly reduces the magnitude of the reflections in the bus waveguide in the first place. This alleviates the potential need to modify the bus waveguide to suppress reflections via destructive interference. A benefit of this is that the overall system design is simplified.

It should be noted that, although the invention is proposed as an alternative solution to prior-art back-reflection suppression approaches, the teachings provided herein are can also be used in conjunction with prior art. If other methods are utilized to suppress/eliminate reflections on the input port, "architectural" approaches in accordance with the present disclosure further reduce the magnitude of any residual backwards propagating modes that may persist due to imperfect destructive interference along the anti-reflection grating.

Furthermore, the teachings of the present disclosure are intended to support techniques aiming to eliminate the secondary reflections of contra-DC filters, so as to architecturally protect the integrated circuit from backward travelling modes. Effort should still be made through careful, well-optimized design to ensure that reflections are only weakly induced. Since the invention aims to have the contra-directional filters do double-duty, the optimization of the filter lineshape becomes even more pronounced.

Embodiments in accordance with the present disclosure can provide a significantly wider bandwidth over which reflection suppression can be accommodated. When implementing an anti-reflection grating, the bandwidth is primarily dictated by the strength of the grating. Physically, this corresponds to the achievable contrast between high-, and low-index regions of the element. As a result, reflection suppression over a broad bandwidth can require gratings with physical features that are difficult to fabricate, or are too difficult to implement from a design perspective.

Additional advantages afforded by embodiments in accordance with the present disclosure include:

i. suppression of reflections commonly encountered with contra-directional coupler-based filtering approaches using a trivially scalable architecture; or ii. suppression of reflections which would jeopardize sensitive upstream active components without necessitating complicated device designs; or iii. exploitation of the working principle of contra-directional filters to simultaneously suppress N back-reflections in an N-channel system with at most one additional filtering element; or iv. additional capability of suppressing reflections over a much wider bandwidth than it is possible with alternative methods; or v. any combination of i, ii, iii, and iv.

It should be noted that a variety of approaches can be used to address the backward propagating modes in the grating elements of filters 202, which arise due to reflections at $\lambda_{BrGr}$. The selection of the manner for addressing these modes is typically based upon such factors as the signal spectrum, the spectral range under consideration (which dictates the geometry of grating element 104), and the like.

Figure 3:
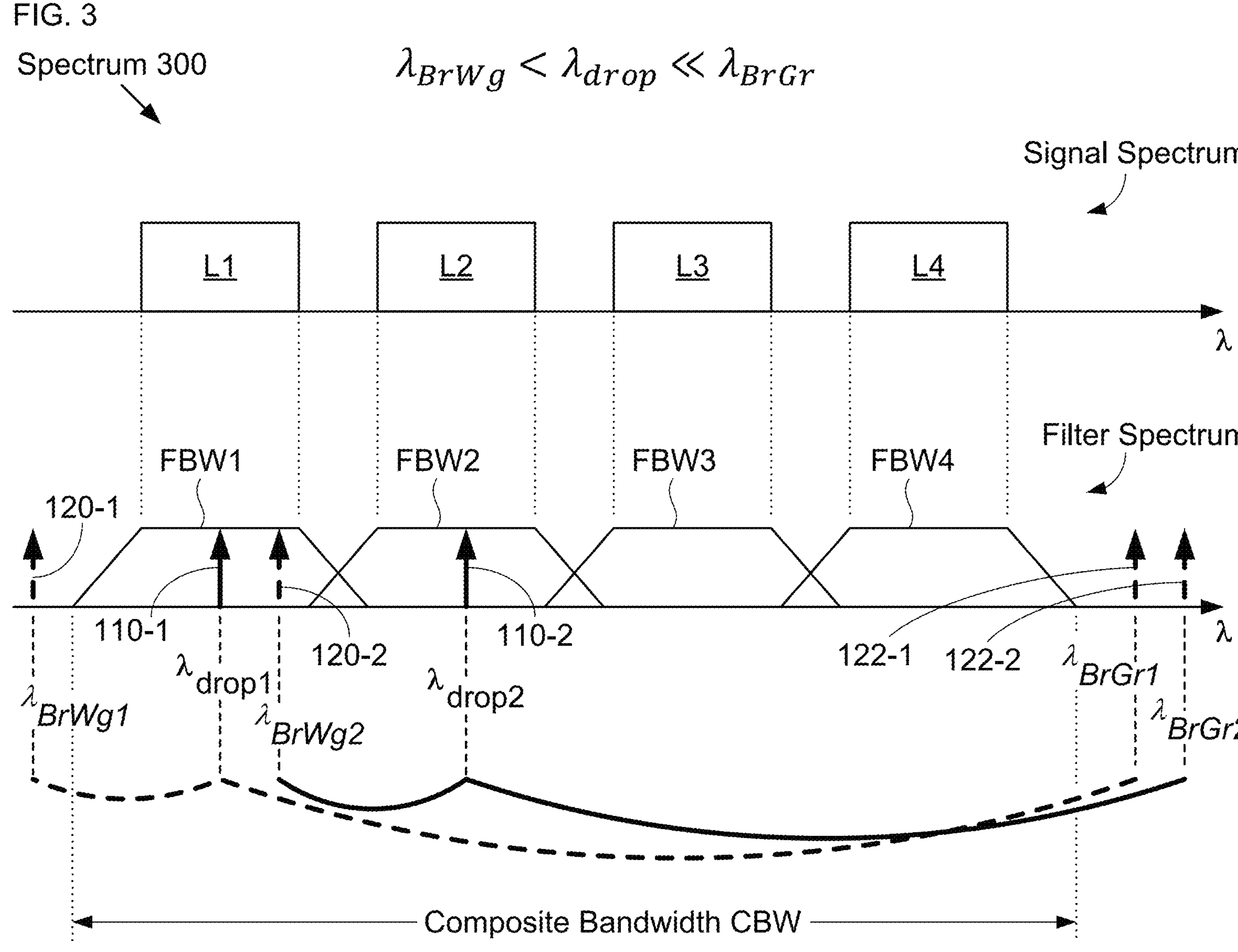
FIG. 3 depicts the spectral response of a first exemplary approach for addressing backward propagating modes in the grating elements of a system architecture in accordance with the present disclosure.

FIG. 3 depicts the spectral response of a first exemplary approach for addressing backward propagating modes in the grating elements of a system architecture in accordance with the present disclosure. Spectrum 300 shows the spectral response of an N-filter system architecture in which all its filters 202 are configured such that reflection signals 122-1 through 122-N (i.e., the reflections at $\lambda_{BrGr}$ from all filters) are located outside of composite bandwidth CBW, which is the spectral range defined by all of filter bandwidths FBW1 through FBWN. As will be apparent to one skilled in the art, after reading this Specification, composite bandwidth CBW represents the total operating wavelength range of a system in accordance with the present disclosure (i.e., the spectral range in which any signal components might be present).

In the depicted example, N=4; therefore, CBW includes FBW1 through FBW4. As noted above, however, N can be any practical number without departing from the scope of the present disclosure.

It should be noted that, since all of reflection signals 122 manifest at wavelengths located outside composite bandwidth CBW, the inclusion of beam dumps 214 is not necessary for systems having spectra analogous to spectrum 300.

Furthermore, for clarity, only the spectral responses of filters L1 and L2 are shown in FIG. 3; however, one skilled in the art will recognize that the responses of filters L3 and L4 are analogous to those of filters L1 and L2.

Figure 4:
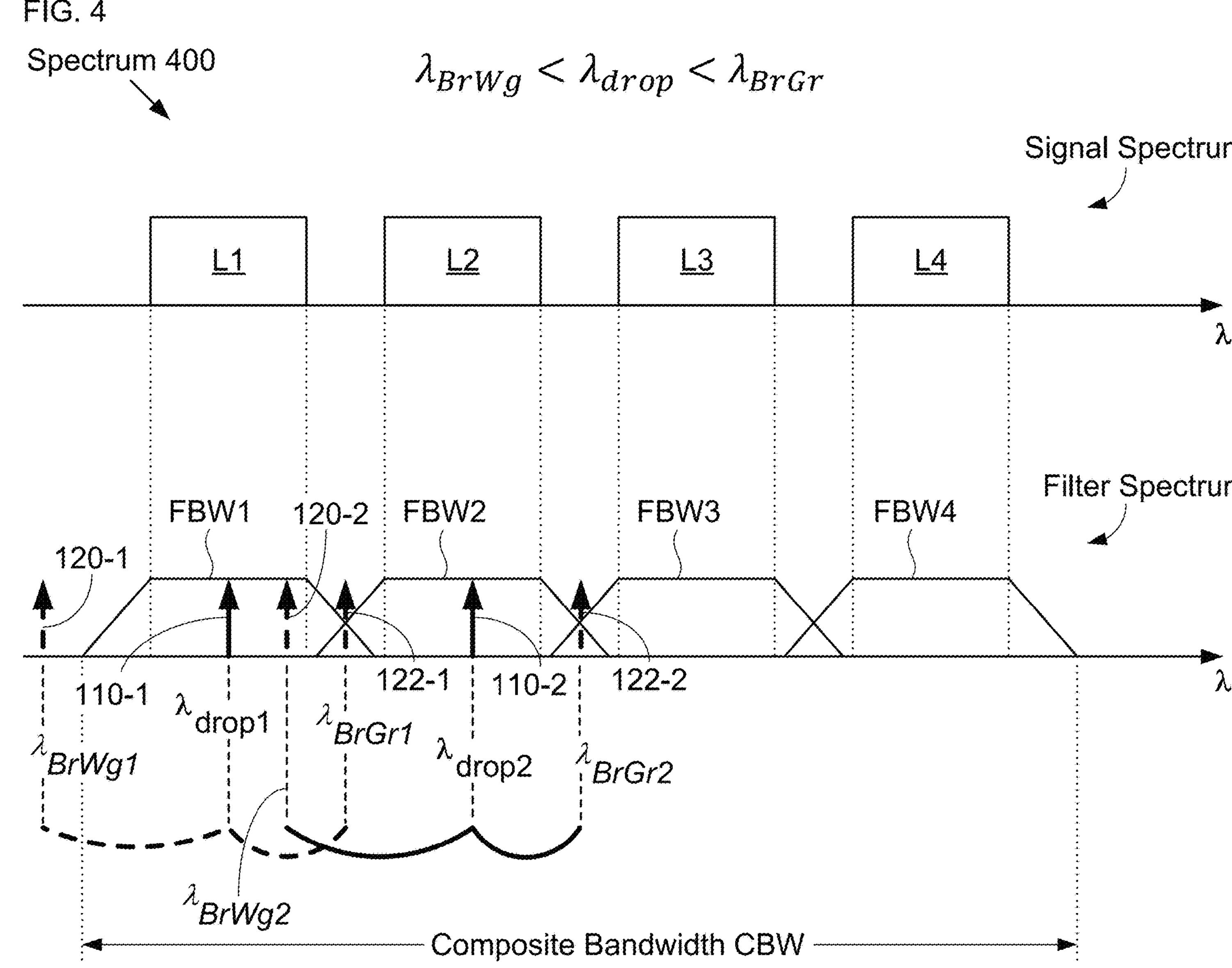
FIG. 4 depicts the spectral response of a second exemplary approach for addressing backward propagating modes in the grating elements of a system architecture in accordance with the present disclosure.

FIG. 4 depicts the spectral response of a second exemplary approach for addressing backward propagating modes in the grating elements of a system architecture in accordance with the present disclosure. Spectrum 400 shows the spectral response of an N-filter system architecture in which the reflection signal 122 from each filter is positioned at the center of the inter-channel gap defined by its filter bandwidth FBW and the filter bandwidth of the next filter in the series of filters ($\lambda_{drop}<\lambda_{BrGr}$).

In the depicted example, N=4; however, as noted above, N can be any practical number without departing from the scope of the present disclosure.

It should be noted that, in contrast to systems characterized by spectrum 300, in some systems characterized by spectrum 400, it is preferable to include a beam dump to suppress reflected signal 122-N.

For clarity, only the spectral responses of filters L1 and L2 are shown in FIG. 4; however, one skilled in the art will recognize that the responses of filters L3 and L4 are analogous to those of filters L1 and L2.

Figure 5:
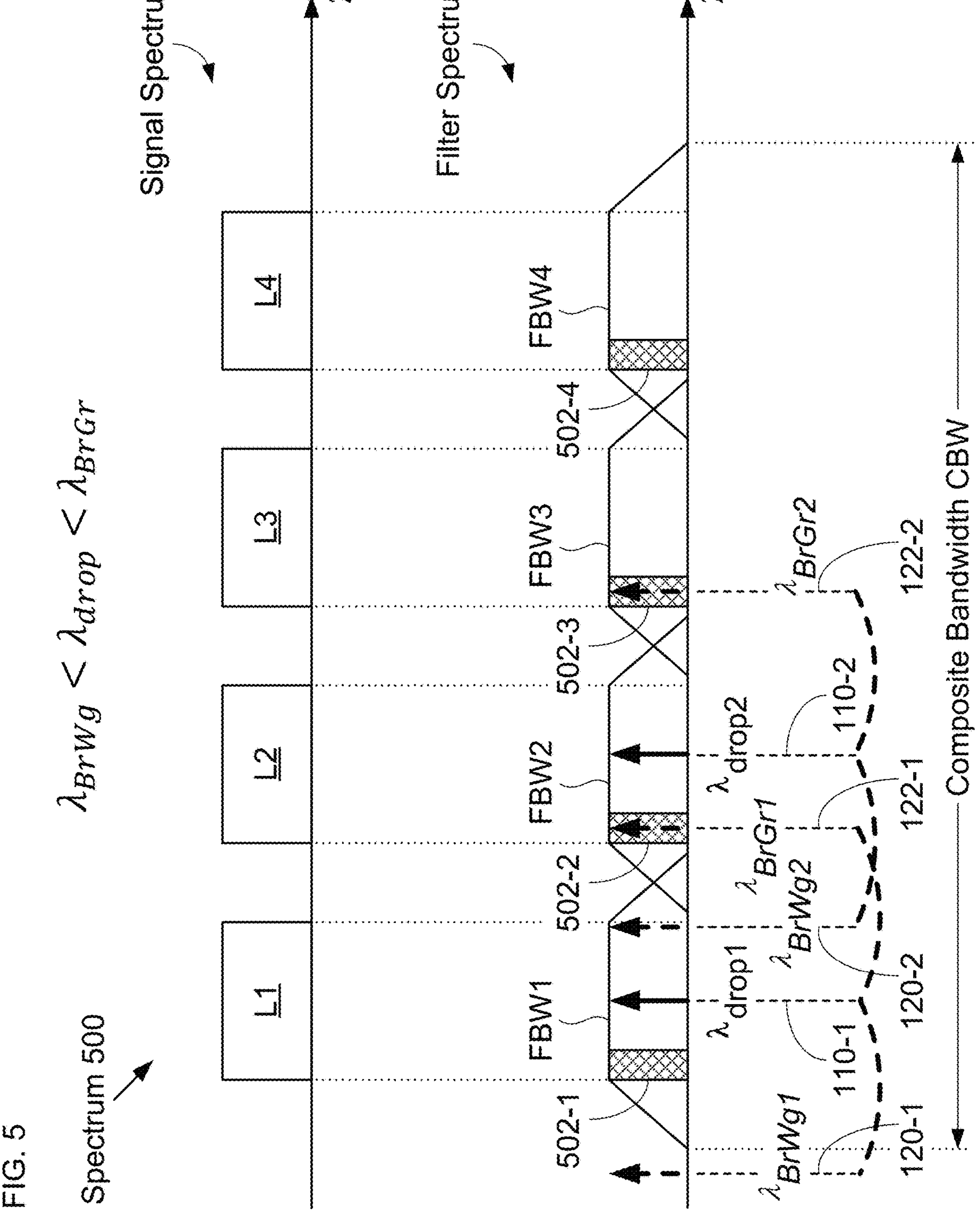
FIG. 5 depicts the spectral response of a third exemplary approach for addressing backward propagating modes in the grating elements of a system architecture in accordance with the present disclosure.

FIG. 5 depicts the spectral response of a third exemplary approach for addressing backward propagating modes in the grating elements of a system architecture in accordance with the present disclosure. Spectrum 500 shows the spectral response of an N-filter system architecture in which the reflection signal 122 (i.e., the reflected signal containing $\lambda_{BrGr}$) from each filter is positioned inside a "pad" region included in the filter bandwidth FBW of the next filter in the chain ($\lambda_{drop}<\lambda_{BrGr}$).

It should be noted that the filter bandwidth, FBW, of each filter 202 must be made sufficiently large to accommodate both its respective wavelength channel, L, and the reflected signal 122 from the filter that precedes it in the series of filters. The spectral region added to each filter bandwidth for accommodating reflected signal 122 is denoted as pad region 502.

In the depicted example, N=4; however, as noted above, N can be any practical number without departing from the scope of the present disclosure.

It should be noted that all of the architecture examples discussed thus far comprise contra-DC filters that are arranged in "shortest-wavelength to longest-wavelength" order, in which each filter is characterized by $\lambda_{BrWg}<\lambda_{Drop}<\lambda_{BrGr}$. However, as noted above, the teachings herein are also suitable for use in architectures comprising contra-DC filters arranged in a "longest-wavelength to shortest-wavelength" order, in which each filter is characterized by $\lambda_{BrGr}<\lambda_{Drop}<\lambda_{BrWg}$.

FIG. 6 depicts the spectral response of an exemplary approach for addressing backward propagating modes in the grating elements of a system architecture comprising contra-DC filters arranged in a "longest-wavelength to shortest-wavelength" order in accordance with the present disclosure. Spectrum 600 shows the spectral response of an N-filter system architecture in which the filter responses of filters 200 are reversed (i.e., $\lambda_{BrGr}<\lambda_{Drop}<\lambda_{BrWg}$). In such architectures, the location of pad 502 shifts to the red side of the filtering spectrum of each filter. In the depicted example, N=4; however, as noted above, N can be any practical number without departing from the scope of the present disclosure.

It is to be understood that the disclosure teaches just some examples of the illustrative embodiment and that many variations of the invention can easily be devised by those skilled in the art after reading this disclosure and that the scope of the present invention is to be determined by the following claims.

What is claimed is:

1. A wavelength division multiplexed (WDM) system comprising:

a bus waveguide for receiving a WDM signal that includes a plurality of wavelength signals, wherein the bus waveguide includes a plurality of bus-waveguide portions; and a plurality of contra-directional coupler (contra-DC) filters that is optically coupled with the bus waveguide, wherein each contra-DC filter of the plurality thereof is characterized by a different filter bandwidth and different drop signal that includes a drop wavelength, and wherein the plurality of contra-DC filters is arranged in a series along the bus waveguide such that the plurality of filter bandwidths are non-overlapping and the plurality of drop wavelengths changes monotonically along the series;

wherein each contra-DC filter includes a grating element that is optically coupled with a different bus-waveguide portion of the plurality thereof, the grating element comprising a periodic arrangement of teeth and a grating waveguide that extends through the entire length of the grating element, the grating waveguide including a drop port.

2. The WDM system of claim 1 wherein the plurality of drop wavelengths increases monotonically along the series.

3. The WDM system of claim 1 wherein a first contra-DC filter of the plurality thereof gives rise to a first reflected signal on the bus waveguide, and wherein the first reflected signal has a first reflected spectrum that is within the filter bandwidth of a second contra-DC filter of the plurality thereof, and further wherein the first and second contra-DC filters are adjacent in the series.

4. The WDM system of claim 3 wherein the plurality of filter bandwidths collectively defines a composite bandwidth, and wherein each contra-DC filter of the plurality thereof gives rise to a second reflected signal on its respective grating waveguide, and further wherein each of the plurality of second reflected signals has a reflected spectrum that is outside the composite bandwidth.

5. The WDM system of claim 3 wherein the first contra-DC filter of the plurality thereof gives rise to a second reflected signal on its respective grating waveguide, and wherein the second reflected signal has a second reflected spectrum that is between the filter bandwidth of the first contra-DC filter and the filter bandwidth of a second contra-DC filter that is adjacent to the first contra-DC filter in the series.

6. The WDM system of claim 3 wherein each filter bandwidth of the plurality thereof includes a pad region, and wherein the first contra-DC filter of the plurality thereof gives rise to a second reflected signal on its respective grating waveguide, and wherein the second reflected signal has a second reflected spectrum that is within the pad region of a second contra-DC filter that is adjacent to the first contra-DC filter in the series.

7. The WDM system of claim 1 wherein each contra-DC filter includes a different portion of the bus waveguide, and wherein, at each contra-DC filter of the plurality thereof, its respective bus-waveguide portion and grating element are configured to define first and second taper regions and a mirror region located between the first and second taper regions, the mirror region being a strongly coupled region for a first light signal, the grating waveguide being included in each of the first and second taper regions and the mirror region, and wherein the first taper region includes a first adiabatic coupler for adiabatically transitioning the first light signal between a first weak coupling region and the mirror region, and further wherein the second taper region includes a second adiabatic coupler for adiabatically transitioning a second light signal between the mirror region and a second weak coupling region, the second light signal including at least a portion of the first light signal.

8. The WDM system of claim 7 wherein each bus-waveguide portion of the plurality thereof has a first core having a first width at an input port and a second width at the mirror region of its respective contra-DC filter, the first width being larger than the second width.

9. The WDM system of claim 1 wherein each tooth of the periodic arrangement of teeth has a tooth length that varies according to its position within the periodic arrangement.

10. The WDM system of claim 1 wherein at least one drop signal of the plurality thereof includes a wavelength channel that is a coarse wavelength division multiplexing (CDWM) channel, and wherein the CWDM channel includes a plurality of dense wavelength division multiplexing (DWDM) signals.

11. A method for dropping at least one wavelength signal from a wavelength divisional multiplexed (WDM) signal that includes a first plurality of wavelength signals, the method comprising:

providing the WDM signal on a bus waveguide that is operatively coupled with a plurality of contra-directional coupler (contra-DC) filters, wherein each contra-DC filter of the plurality thereof is characterized by a different filter bandwidth and different drop signal that includes a drop wavelength, and wherein the plurality of contra-DC filters is arranged in a series along the bus waveguide such that the plurality of filter bandwidths are non-overlapping and the plurality of drop wavelengths changes monotonically along the series;

dropping a first drop signal to a first drop port of a first contra-DC filter of the plurality thereof; and dropping a second drop signal at a second drop port of a second contra-DC filter of the plurality thereof.

12. The method of claim 11 further comprising providing the plurality of contra-DC filters such that the plurality of drop wavelengths increases monotonically along the series.

13. The method of claim 11 wherein the first contra-DC filter gives rise to a first reflected signal on the bus waveguide, the first reflected signal having a first reflected spectrum, and wherein the method further includes:

providing the first and second contra-DC filters such that they are adjacent in the series, wherein the second contra-DC filter is provided such that its respective filter bandwidth includes the first reflected spectrum; and suppressing the first reflected signal at the second contra-DC filter.

14. The method of claim 13 wherein the first contra-DC filter gives rise to a second reflected signal on its respective grating waveguide, the second reflected signal having a second reflected spectrum, and wherein the method further includes:

providing the plurality of contra-DC filters such that the plurality of filter bandwidths defines a composite bandwidth that is non-inclusive of the second reflected spectrum.

15. The method of claim 13 wherein the first contra-DC filter gives rise to a second reflected signal on its respective grating waveguide, the second reflected signal having a second reflected spectrum, and wherein the method further includes:

providing the first and second contra-DC filters such that they are adjacent in the series and such that second reflected spectrum is between their respective filter bandwidths.

16. The method of claim 13 wherein the first contra-DC filter gives rise to a second reflected signal on its respective grating waveguide, the second reflected signal having a second reflected spectrum, and wherein the method further includes:

providing the plurality of contra-DC filters such that each filter bandwidth includes a pad region, wherein the pad region included in the filter spectrum of the second contra-DC filter includes the second reflected spectrum.

17. The method of claim 11 wherein each contra-DC filter of the plurality thereof is provided such that it includes a different bus-waveguide portion of the bus waveguide, and wherein, at each contra-DC filter of the plurality thereof, its respective bus-waveguide portion and grating element are configured to define first and second taper regions and a mirror region located between the first and second taper regions, the mirror region being a strongly coupled region for a first light signal, the grating waveguide being included in each of the first and second taper regions and the mirror region, and wherein the first taper region includes a first adiabatic coupler for adiabatically transitioning the first light signal between a first weak coupling region and the mirror region, and further wherein the second taper region includes a second adiabatic coupler for adiabatically transitioning a second light signal between the mirror region and a second weak coupling region, the second light signal including at least a first portion of the first light signal.

18. The method of claim 17 wherein each contra-DC filter of the plurality thereof is provided such that its respective bus-waveguide portion has a core having a first width at an input port and a second width at the mirror region of its respective contra-DC filter, the first width being larger than the second width.

19. The method of claim 11 wherein at least one contra-DC filter of the plurality thereof is provided such that its respective drop signal includes a wavelength channel that is a CDWM channel, and wherein the CWDM channel includes a plurality of DWDM signals.

* * * * *